(12) United States Patent
Sauter

(10) Patent No.: US 10,451,106 B2
(45) Date of Patent: Oct. 22, 2019

(54) ROTARY BEARING

(71) Applicant: Liebherr-Components Biberach GmbH, Biberach an der Riss (DE)

(72) Inventor: Herbert Sauter, Biberach (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/924,035

(22) Filed: Mar. 16, 2018

(65) Prior Publication Data

US 2018/0209477 A1    Jul. 26, 2018

Related U.S. Application Data

(63) Continuation of application No. PCT/EP2016/001293, filed on Jul. 26, 2016.

(30) Foreign Application Priority Data

Sep. 18, 2015   (DE) .................... 20 2015 006 588 U

(51) Int. Cl.
| F16C 21/00 | (2006.01) |
| F16C 17/10 | (2006.01) |
| F16C 19/38 | (2006.01) |
| F16C 17/02 | (2006.01) |
| F16C 33/58 | (2006.01) |
| F16C 33/60 | (2006.01) |

(52) U.S. Cl.
CPC .............. *F16C 21/00* (2013.01); *F16C 17/02* (2013.01); *F16C 17/10* (2013.01); *F16C 19/381* (2013.01); *F16C 33/585* (2013.01); *F16C 33/60* (2013.01); *F16C 2240/70* (2013.01); *F16C 2300/14* (2013.01)

(58) Field of Classification Search
CPC ...... F16C 17/10; F16C 17/107; F16C 19/381; F16C 21/00; F16C 33/585; F16C 33/60; F16C 2240/70; F16C 2300/14
See application file for complete search history.

(56) References Cited

U.S. PATENT DOCUMENTS 9,784,308 B2 * 10/2017 Fiesel .................... F16C 35/061
9,909,567 B2 *  3/2018 Frank .................... F16C 19/188
2009/0022442 A1    1/2009 Bech et al.

FOREIGN PATENT DOCUMENTS

| DE | 19962978 | 8/2001 |
| DE | 20202463 | 5/2002 |
| DE | 202007002609 | 4/2008 |

(Continued)

*Primary Examiner* — James Plinkington
(74) *Attorney, Agent, or Firm* — Levine Bagade Han LLP

(57) ABSTRACT

A rotary bearing, in particular a large open-centered ring bearing, having two concentric bearing races, of which one bearing race has a groove which is open toward the other bearing race, and the other bearing race has a lug ring that engages in the aforementioned groove. The lug ring can be supported against the groove in the axial and radial directions of the rotary bearing with a plurality of bearing assemblies that include at least two axial bearings mounted on opposite lug ring end faces, and at least one radial bearing that is mounted on an outer surface of the lug ring. The plurality of bearing assemblies have at least one sliding bearing and at least one rolling bearing situated between the lug ring and the groove.

20 Claims, 2 Drawing Sheets

(56) References Cited

FOREIGN PATENT DOCUMENTS

| DE | 102011083824 | | 4/2013 |
|----|--------------|---|--------|
| DE | 102012004329 | * | 8/2013 |
| EP | 2092204 | | 8/2009 |
| WO | WO 2008/088213 | | 7/2008 |
| WO | WO 2015/055317 | | 4/2015 |
| WO | WO 2017/045734 | | 3/2017 |

* cited by examiner

ROTARY BEARING

CROSS-REFERENCE TO RELATED APPLICATIONS

The present application is a continuation of International Application No. PCT/EP2016/001293, filed Jul. 26, 2016, which claims priority to German Utility Model Application No. 20 2015 006 588.0, filed Sep. 18, 2015, both of which are incorporated by reference herein in their entireties.

BACKGROUND

1) Technical Field

The present invention relates to a rotary bearing, in particular a large open-centered ring bearing, comprising two concentric bearing races, of which one bearing race has a groove which is open toward the other bearing race, and the other bearing race has a lug ring that engages in the aforementioned groove, wherein the lug ring is supported against the groove in the axial and radial directions of the rotary bearing by means of a plurality of bearing assemblies that comprise at least two axial bearings mounted on opposite lug ring end faces, and at least one radial bearing that is mounted on an outer surface of the lug ring.

2) Description of the Related Art

In large ring bearings for special purposes, significant bending moments and tilting forces sometimes act upon the bearing rings, and this can lead to deformation and an angular offset to the bearing races relative to each other, and so premature wear occurs in the region of the bearing races and rolling elements. Slewing bearings of this type can measure several meters in diameter and can be employed on cranes, for instance, to pivot and support the support mast of a ship crane or of a harbor crane, wherein not only vertical forces but also bending moments and/or tilting loads have to be absorbed here. In this case, the problems of twisting and tilting are further aggravated when the middle or center of the bearing has to be kept free to permit the component that is to be supported, such as the aforementioned crane support mast, to pass through the bearing, for example so that a rotary drive can be attached to the part that is to pass through. Due to a lack of space, the bearing rings of an open-center slewing bearing such as this cannot be manufactured in any desired size, especially in the radial direction, and so the area moments of inertia that can be achieved in the bearing races are limited.

Added to this are the very specific load characteristics associated with this kind of large ring bearings, which in typical applications, such as crane tower or crane mast bearings or rotor blade bearings for adjusting the pitch angle of the rotor blades of wind turbines, remain stationary for a large portion of their operating and service lives, but which are nevertheless subjected to high loads. In light of the large proportion of downtime and yet high loads, it is not entirely simple to prevent fatigue-related deformations and surface damage to the tracks and rolling elements in the long term and to ensure that they start up and rotate smoothly from a standstill, especially since the rotational speeds are quite low. To be able to absorb these high loads at a standstill without any remaining deformations on the tracks and/or rolling elements while nevertheless ensuring a smooth start from the standstill, cylindrical roller bearings with very large cylinder diameters are often used which, in contrast to needle roller bearings that have very small rolling element diameters or to ball bearings, exhibit a certain elasticity that can more effectively distribute loads and can achieve smaller surface pressures. However, space problems can arise in this type of cylindrical roller bearings with quite large cylinder diameters, since cylindrical roller bearing of this kind require a lot of installation space.

A slewing bearing of the aforementioned type is shown, for example, in document EP 20 92 204 B1, according to which the lug ring of the one bearing race should be clamped in place by two axial bearings lying opposite each other and two radial bearings lying opposite each other in the groove of the other bearing race, wherein the oppositely disposed axial bearings and radial bearings should prevent undesirable deformation of the lug ring and should prevent the bearing races from separating in the radial direction. A similar slewing bearing and its installation situation on the support mast of a ship crane is disclosed in document WO 2008/088 213 A2. While the cited documents deal substantially with the problems associated with the separation of the radial bearings as a consequence of the twisting of the bearing races and seek to prevent a lifting of the radial bearings by clamping the lug ring from opposite sides of the lateral surface, it is still possible for canting and twisting to occur in the region of the axial bearings.

Generally, the vertical crane loads and the corresponding reaction forces in the crane mast support still account for a large or considerable part of the rotary bearing load, and so the lower axial bearing, which has to absorb the vertical crane loads, is typically configured in the form of a load-carrying cylindrical roller bearing, the cylindrical rollers of which have a relatively large cylindrical roller width in order to allow for a sufficiently large contact line and to keep surface pressures tolerable. On the other hand, such wide cylindrical roller bearings react critically to tilting and/or inclinations of the tracks relative to each other, since very quickly only a very small part of the cylindrical rollers actually bears a load.

In this regard, it has already been proposed that the number of bearing assemblies used be increased to achieve further, more stable support for the lug ring. For example, document WO 2015/055317 A2 proposes the use of three axial bearings, two of which are arranged on one side of the lug ring and the third is arranged on the opposite side of the lug ring. Additionally, the lug ring is supported by two oppositely disposed radial bearings. However, increasing the number of bearing assemblies can result in a larger construction volume, since not only do the rolling bearings require air perpendicular to the rotary axis of the rolling element, but the rotary axes should be distanced from each other in the direction of the rolling elements, as well, if multiple rolling bearings are arranged next to each other on one side of the lug ring. In confined installation conditions, this can cause problems, at least when the lug ring and/or the ring sections of the grooved ring supported on it are not thinned out too much, which would nullify the increase in tilting and torsional rigidity achieved by the larger number of bearing assemblies.

The present invention addresses the problem of producing an improved rotary bearing of the aforementioned type, which avoids the disadvantages of the prior art and develops the prior art in an advantageous way. In particular, a large open-centered ring bearing should be produced that has a compact design for confined installation spaces and can absorb high axial loads without thereby being susceptible to tilting loads and inclinations of the tracks.

SUMMARY

According to the invention, the stated problem is solved by a rotary bearing as disclosed herein. Preferred configurations of the invention are the subject matter of the dependent claims.

It is therefore proposed not only to provide rolling bearings between the lug ring and the groove in the other bearing race, but also to combine rolling bearings with sliding bearings so that the lug ring is supported on the groove both by sliding bearings and by rolling bearings and so that some of the load is absorbed by sliding bearings and some of the load is absorbed by rolling bearings. According to the invention, the plurality of bearing assemblies have at least one sliding bearing and at least one rolling bearing situated between the lug ring and the groove. Using a skillfully selected combination of sliding and rolling bearings, a smooth start-up out of a standstill can be achieved in a compact design, which is also well-suited for confined installation situations, and a precise absorption of the various force components can be achieved both during a standstill and during rotary operation in order to avoid twisting or even tilting of the lug ring toward the groove.

In a further embodiment of the invention, at least one radial bearing is configured as a sliding bearing, while at least one axial bearing can be configured as a rolling bearing. Since in typical use cases, the axial forces are frequently predominant, often even significantly greater than the radial bearing forces, it is possible to achieve a smooth start-up from a standstill by means of the rolling bearing that functions as an axial bearing, while it is possible to achieve an especially compact bearing structure that nevertheless absorbs the radial forces sufficiently well by using the at least one sliding bearing, which functions as a radial bearing.

According to an advantageous development of the invention, sliding and rolling bearings can also be combined in the axial bearings so that bearing forces in the radial direction are also absorbed effectively and a smooth start-up is ensured. In particular, at least one of a plurality of radial bearings can be configured as a sliding bearing and at least one other of the plurality of radial bearings can be configured as a rolling bearing, wherein the sliding and rolling bearings that function as radial bearings can advantageously be arranged on opposite sides of the lug ring.

If radial bearings are provided on opposite sides of the lug ring as described, it is advantageous for the radial bearing configured as a sliding bearing to be arranged on an outer side of the lug ring, while the radial bearing configured as a rolling bearing can be arranged on an inner side of the lug ring. By arranging the sliding bearing on the outer side of the lug ring, space is created for the edge web of the bearing race, which encompasses the lug ring from the outside in a finger-like manner so that said bearing race edge web can be more substantial and/or can be less thinned out while having a radially compact design. Further increase rigidity can be achieved in this way despite the more compact design.

In a further embodiment of the invention, the sliding bearing functioning as a radial bearing and the rolling bearing on the opposite side, which likewise functions as a radial bearing, can overlap with each other, as viewed in the radial direction, but are advantageously offset from each other slightly in the axial direction, and so the sliding bearing and the rolling bearing do not lie in the same plane. Advantageously, the sliding bearing can be displaced further toward one of the axial bearings, while the sliding bearing is arranged more centrally between the axial bearings lying opposite each other.

If one considers a virtual central plane extending perpendicular to the rotary axis of the bearing between the two axial bearings, specifically equidistant from the axial bearings arranged on opposite sides of the lug ring, i.e. disposed at an equal distance from these two axial bearings, the sliding bearing that functions as a radial bearing is advantageously distanced further from the aforementioned central plane that the rolling bearing that also functions as a radial bearing. In this way, a more even absorption of radial forces is achieved with a reduced tendency to deformation of the lug ring, without thereby causing space problems. The sliding bearing can be slid closer to one of the axial bearings without causing space problems, while the rolling bearing, which is positioned more centrally between the axial bearings and which functions as a radial bearing, can absorb in a more balanced way the radial bearing forces that arise more centrally between the axial bearings.

In a further embodiment of the invention, the sliding bearing that functions as a radial bearing can be arranged such that it overlaps with one of the axial bearings, as viewed in the radial direction. Said sliding bearing can thus encompass one of the axial bearings, so to speak.

In one advantageous development of the invention, the axial bearings that support the lug ring on the groove in the direction of the rotary axis of the rotary bearing can each be configured as rolling bearings in order to absorb the often very high axial forces optimally. In this case, it is advantageous to provide two axial bearings, which are arranged on opposite sides of the lug ring.

Viewed in the axial direction, the two axial bearings can overlap with each other, but are advantageously offset from each other slightly so that one axial bearing has a smaller diameter than the other axial bearing.

If necessary, a third axial bearing can also support the lug ring opposite the groove, and thus the one bearing race opposite the other bearing race, so that high axial forces can be absorbed with narrower bearings and can be distributed to various support points. In so doing, the two axial bearings located on the same front side of the lug ring are not only distanced from each other transversely but are also offset in the axial direction in order to gain more and thus greater robustness with regard to twisting and inclination. Advantageously, the lug ring is supported on the groove in the axial direction by a third axial bearing, wherein two axial bearings are arranged on the same side of the lug ring on separate tracks, which are offset from each other in the axial direction of the rolling bearing. As a result of the axial offset of the tracks of the two axial bearings on the same front side of the lug ring, the axial bearings gain different fulcrum ratios although they are arranged on the same side of the lug ring, and so improved support can be achieved in the event of twisting and track inclination, and the two axial bearings are never subjected to canting or withdrawal in the same way at the same time.

Advantageously, the two axial bearings on the same front side of the lug ring can each have a width that is smaller than the width of the axial bearing situated on the opposite face of the lug ring. If cylindrical roller bearings are used as axial bearings, then this width is the length of the rolling element and/or the width of the track of the bearing. If sliding bearings are used as axial bearings, then this width is the width of the sliding block element, or if multiple sliding cushions are used it is the sum of the widths of the sliding blocks and/or the width of the track of the sliding bearing. By using two independent, relatively narrow tracks for the two axial bearings on the same front face of the lug ring, it is more easily possible to adapt the inclination of from a deformation of the connection structure. Additionally, two such offset and relatively narrow tracks in the sum bring about a longer line contact between the rolling elements and tracks or between the sliding block and track, in particular also when slight inclinations of the tracks occur as a result of deformations. Moreover, narrow tracks are also easier to produce with greater precision from a manufacturing perspective, and so shape tolerances also occur less often and carry little weight.

In principle, the aforementioned axial offset of the two axial bearings on the same front side can be configured or dimensioned differently. In order to achieve significant decoupling with regard to twisting and different support ratios, the offset in a further embodiment of the invention is at least 10%, but less than 200% of the stated diameter of the rolling element.

In a further embodiment of the invention, a combination of sliding and rolling bearings can also be provided for the axial bearings. Particularly when three axial bearings are provided in the aforementioned manner, one of said axial bearings can be configured as a sliding bearing, wherein preferably one of the two axial bearings arranged on the same side of the lug ring can be configured as a sliding bearing so that a sliding bearing and a rolling bearing can be combined with each other on this side of the lug ring.

When the axial bearing arranged on the opposite front faces of the lug ring are observed, the axial bearings can advantageously have different track diameters, wherein an advantageous development of the invention provides that at least one of the two axial bearings on the same front side if the lug ring, such as the sliding bearing disposed there, does not overlap with the axial bearing arranged on the other front side of the lug ring when the axial bearings are viewed in the axial direction. The axial direction in this instance means the rotary axis of the rolling bearing.

In an advantageous development of the invention, it is possible that one of the two axial bearings arranged on the same front side of the lug ring, such as the rolling bearing, overlaps with the axial bearing on the other front side of the lug ring, as viewed in the axial direction, while the other of the two axial bearings on the same front side of the lug ring, such as the sliding bearing, does not overlap with the axial bearing on the other front side of the lug ring.

BRIEF DESCRIPTION OF THE DRAWINGS

Hereafter, the invention is explained in greater detail on the basis of preferred embodiments and associated drawings. The drawings show.

DETAILED DESCRIPTION

Figure 1:
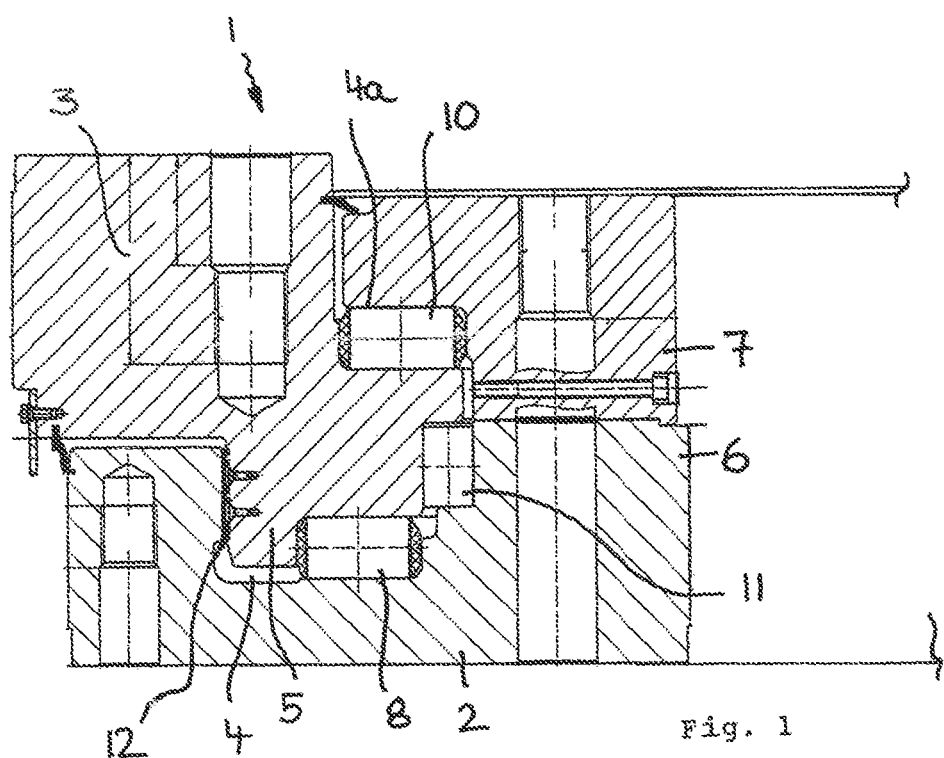
FIG. 1: shows a longitudinal half-section of an open-center slewing bearing according to an advantageous embodiment of the invention, in which the two bearing races are supported against each other by two axial bearings in the form of cylindrical roller bearings and two radial bearings in the form of one cylindrical roller bearing and one sliding bearing.
Figure 2:
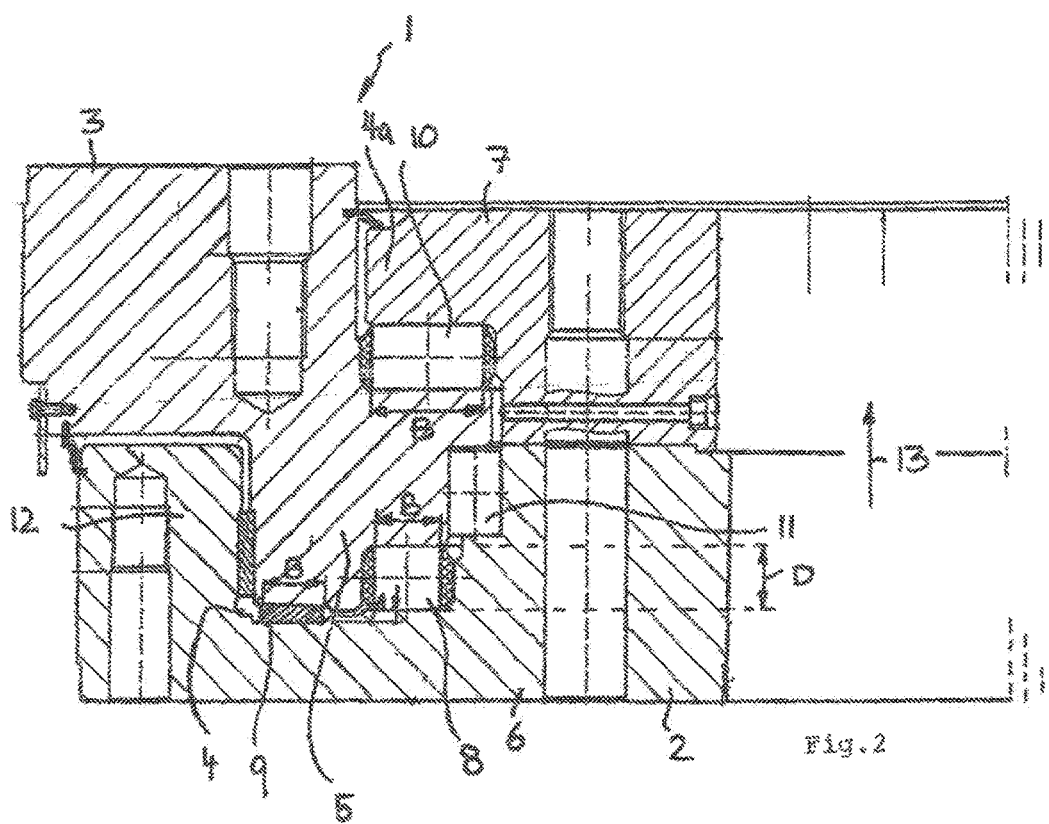
FIG. 2: shows a longitudinal half-section through an open-center slewing bearing according to a further embodiment of the invention, in which the two bearing races are supported against each other by three axial bearings in the form of one sliding bearing and two cylindrical roller bearings and two radial bearings in the form of one sliding bearing and one cylindrical roller bearing.

As FIGS. 1 and 2 show, the rolling bearing 1 can comprise two bearing races 2 and 3, of which one bearing race 2 forms an inner ring and the other bearing race 3 forms an outer ring. Said inner ring 2 can have a smaller inner diameter than the outer ring 3 and/or the outer ring 3 can have a larger outer diameter than the inner ring 2.

The one bearing race 2, preferably the inner ring, can have a groove 4 which is open toward the other bearing race 3, preferably toward the outer ring, and into which the other bearing race 3 engages with a lug ring 5 that is provided thereon so as to form a gap and/or with spacing on all sides. This groove 4 can advantageously encompass the lug ring 5 from four sides, namely on two opposing sides of the lateral surface and on two opposing sides of the front side of the lug ring 5.

Here, said groove 4 has a—roughly—U-shaped bottom contour in which the groove bottom—right and left in FIG. 1—is encompassed by two bearing ring limbs. Furthermore, the groove 4 can have a transversely projecting prolongation 4a on a side opposite the bottom of the groove, which encompasses the front of lug ring 5 on a side opposite the bottom of the groove. Overall, said groove 4 can be configured such that it is undercut. To be able to inset the lug ring 5 into the groove 4, the bearing race 2 with the groove 4 can be composed of a support ring 6 and a retaining ring 7 that can be placed on the support ring, cf. FIGS. 1 and 2.

As FIG. 1 shows, the lug ring 5 can be supported opposite the groove 4 by two axial bearings 8 and 10 and by two radial bearings 11 and 12. Advantageous here is that the two axial bearings 8 and 10 are disposed on opposite lug ring end faces. The radial bearings 11 and 12 can also advantageously be arranged on opposite sides, namely opposing sides of the lateral surface of the lug ring 5, so that, in each case, the lug ring 5 is embedded in a sandwich-like manner and/or supported both in the axial direction and in the radial direction between bearings located on opposite sides. The lug ring 5 is therefore supported against the groove 4 on all sides.

As FIG. 1 shows, these bearings include both sliding and rolling bearings. In particular, one of the two radial bearings 12 can be configured as a sliding bearing, while the radial bearing 11 lying opposite can be configured as a rolling bearing, especially as a cylindrical roller bearing. In principle, it would also be possible to configure both radial bearings 11 and 12 as sliding bearings or to provide a plurality of sliding bearings as radial bearings, particularly to arrange them on opposite sides of the lug ring. Advantageously, however, by mixing the sliding and rolling bearings shown in FIG. 1, a compact design can be combined with favorable force absorption, which allows for a smooth start-up.

As FIG. 1 shows, the two radial bearings 11 and 12 can overlap with each other as viewed in the radial direction, but can be slightly offset from each other. In particular, the sliding bearing can advantageously be displaced further toward one of the axial bearings 8, while the rolling bearing 11 on the opposite side is arranged more centrally between the two axial bearings. In accordance with the orientation shown in FIG. 1, the sliding bearing 12 and the rolling bearing 11 can be arranged further up. In particular, the sliding bearing, which functions as a radial bearing 12, can cover and/or encompass one of the axial bearings 8 as viewed in the radial direction.

As is shown in FIG. 1, the two axial bearing 8 and 10 can overlap with each other as viewed in the axial direction, but can be slightly offset from each other; in other words, one of the axial bearings 8 can have a larger diameter than the other axial bearing 10. The two axial bearings 8 and 10 can advantageously be configured as cylindrical roller bearings. The rolling bearing that functions as a radial bearing 11 can also be configured as a cylindrical roller bearing, although it is also conceivable that the radial bearing 11 could be configured as a ball bearing.

As FIG. 1 shows, the rolling bearings that function as axial bearings 8 and 10 can have larger cylindrical roller bearing diameters than the radially effective rolling bearing 11 and/or larger cylindrical roller bearing widths than the axially effective cylindrical roller bearing 11. The two axial bearings 8 and 10 can have substantially the same dimensions in this instance; in other words, the same cylindrical roller diameters and the same cylindrical roller widths; cf. FIG. 1.

According to an alternative embodiment shown in FIG. 2, the lug ring 5 can also be supported opposite the groove 4 by three axial bearings 8, 9 and 10 and by two radial bearings 11 and 12. Advantageously, two of said axial bearings 8 and 9 can be arranged on the same front side of the lug ring—the lower one, according to FIG. 1—and the third axial bearing 10 can be arranged on the opposite front side of the lug ring. The radial bearings 11 and 12 can also be arranged on opposite sides, namely opposing sides of the lateral surface of the lug ring 5, so that the lug ring 5 is embedded in a sandwich-like manner and/or supported both in the axial direction and in the radial direction between bearings located on opposite sides. The lug ring 5 is supported against the groove 4 on all sides.

As FIG. 2 shows, the two axial bearings 8 and 9 provided on the same front side of the lug ring are not only distanced from each other in the radial direction and arranged on different tracks, but they are also offset from each other in the axial direction—i.e. in the direction of the arrow 13—and so the two axial bearings 8 and 9 are not situated at the same height.

In a further embodiment of the invention, at least one axial bearing 9 of the three axial bearings 8, 9 and 10 can be configured as a sliding bearing, preferably one of the two axial bearings 8 and 9 that are arranged on the same front side of the lug ring. Meanwhile, the two other axial bearings 8 and 10 can be configured as rolling bearings, in particular as cylindrical roller bearings, so that there is a combination of sliding and rolling bearings among the axial bearings 8, 9 and 10, as well.

As FIG. 2, shows, the outer of the two axial bearings 9 and 8, which are arranged on the same front side of the lug ring, can be configured as sliding bearings, while the inner axial bearing 8 can be configured as a rolling bearing. It would be possible in principle to configure the inner axial bearing 8 as a sliding bearing and the outer axial bearing 9 as a rolling bearing. According to a further alternative, it would also be possible to configure two of the three axial bearings as sliding bearings and only one as a rolling bearing, wherein the two sliding bearings in this case could be arranged on the same front side of the lug ring or also on opposite front sides of the lug ring.

The two axial bearings 8 and 9 that are arranged on the same front side of the lug ring can have a width B—measured in the radial direction—that is smaller than the width of the axial bearing 10 arranged on the opposite front side of the lug ring, wherein the sum of the two widths of the two axial bearings 8 and 9 can be appropriately equal to the width of the other axial bearing 10.

The two axial bearings 8 and 9 lying on the same front side of the lug ring can be positioned such that one axial bearing 9 overlaps with the axial bearing 10 on the opposite front side of the lug ring when viewed in the axial direction, while the other axial bearing 8 does not have this kind of overlap.

The two radial bearings 11 and 12 can be arranged opposite each other. Independently of this, it can be advantageous when the two radial bearings 11 and 12 are arranged between the axial bearings 8, 9 and 10; cf. FIG. 1.

The invention claimed is:

1. An open-centered ring rotary bearing comprising:
   two concentric bearing races, wherein one of the bearing races has a groove which is open toward the other of the bearing races, and wherein the other of the bearing races has a lug ring that engages in the groove, wherein the lug ring is supported against the groove by a plurality of bearing assemblies that comprise at least two axial bearings mounted on opposite lug ring end faces to provide support in the axial direction, and at least one radial bearing to provide support in the radial direction, wherein the bearing assemblies include both sliding bearings and rolling bearings, wherein the at least one radial bearing comprises a plurality of radial bearings, wherein at least one of the radial bearings is configured as a sliding bearing, and wherein at least one other of the radial bearings is configured as a rolling bearing.

2. The rotary bearing of claim 1, wherein at least one of the axial bearings is configured as a rolling bearing.

3. The rotary bearing of claim 1, wherein the at least one of the radial bearings that includes the sliding bearing is on an opposite side of the lug ring from the at least one of the radial bearings that includes the rolling bearing, wherein the at least one of the radial bearings that includes the sliding bearing is on an outer side of the lug ring and the at least one of the radial bearings that includes the rolling bearing is on an inner side of the lug ring.

4. The rotary bearing of claim 3, wherein the at least one of the radial bearings that includes the sliding bearing and the oppositely disposed at least one of the radial bearings that includes the rolling bearing overlap with each other as viewed in the radial direction, but are offset from each other in the axial direction, and wherein the at least one of the radial bearings that includes the sliding bearing is further distanced from a central plane extending perpendicular to a rotary axis of the rotary bearing than the at least one of the radial bearings that includes the rolling bearing.

5. The rotary bearing of claim 4, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

6. The rotary bearing of claim 3, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

7. The rotary bearing of claim 1, wherein the at least one of the radial bearings that includes the sliding bearing and the oppositely disposed at least one of the radial bearings that includes the rolling bearing overlap with each other as viewed in the radial direction, but are offset from each other in the axial direction, and wherein the at least one of the radial bearings that includes the sliding bearing is further distanced from a central plane extending perpendicular to a rotary axis of the rotary bearing than the at least one of the radial bearings that includes the rolling bearing.

8. The rotary bearing of claim 7, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

9. The rotary bearing of claim 1, wherein the at least one of the radial bearings that includes the sliding bearing overlaps, when viewed in the radial direction, with an axial bearing that includes a rolling bearing.

10. The rotary bearing of claim 1, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

11. An open-centered ring rotary bearing comprising:
two concentric bearing races, wherein one of the bearing races has a groove which is open toward the other of the bearing races, and wherein the other of the bearing races has a lug ring that engages in the groove, wherein the lug ring is supported against the groove by a plurality of bearing assemblies that comprise at least two axial bearings mounted on opposite lug ring end faces to provide support in the axial direction, and at least one radial bearing to provide support in the radial direction, wherein the bearing assemblies include both sliding bearings and rolling bearings, wherein all of the axial bearings except for one axial bearing are configured as cylindrical roller bearings, and wherein the one axial bearing is configured as a sliding bearing.

12. The rotary bearing of claim 11, wherein the at least one radial bearing is configured as a sliding bearing.

13. The rotary bearing of claim 12, wherein the at least one of the radial bearings that includes the sliding bearing overlaps, when viewed in the radial direction, with an axial bearing that includes a rolling bearing.

14. An open-centered ring rotary bearing comprising:
two concentric bearing races, wherein one of the bearing races has a groove which is open toward the other of the bearing races, and wherein the other of the bearing races has a lug ring that engages in the groove, wherein the lug ring is supported against the groove by a plurality of bearing assemblies that comprise at least two axial bearings mounted on opposite lug ring end faces to provide support in the axial direction, and at least one radial bearing to provide support in the radial direction, wherein the bearing assemblies include both sliding bearings and rolling bearings, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

15. The rotary bearing of claim 14, wherein the at least one sliding bearing has a diameter larger than 1 meter.

16. The rotary bearing of claim 14, wherein the at least one radial bearing is configured as a sliding bearing.

17. The rotary bearing of claim 16, wherein the at least one of the radial bearings that includes the sliding bearing overlaps, when viewed in the radial direction, with an axial bearing that includes a rolling bearing.

18. An open-centered ring rotary bearing comprising:
two concentric bearing races, wherein one of the bearing races has a groove which is open toward the other of the bearing races, and wherein the other of the bearing races has a lug ring that engages in the groove, wherein the lug ring is supported against the groove by a plurality of bearing assemblies that comprise at least two axial bearings mounted on opposite lug ring end faces to provide support in the axial direction, and at least one radial bearing to provide support in the radial direction, wherein the bearing assemblies include both sliding bearings and rolling bearings, wherein the at least one radial bearing is configured as a sliding bearing, wherein the at least two axial bearings include at least one sliding bearing and at least one rolling bearing, wherein of the axial bearings, only the axial bearings including the rolling bearings are on a first side of the lug ring and wherein of the axial bearings, at least one axial bearing including a sliding bearing and at least one axial bearing including a rolling bearing are on a second side of the lug ring, and wherein the first side of the lug ring is opposite to the second side of the lug ring.

19. An open-centered ring rotary bearing comprising:
two concentric bearing races, wherein one of the bearing races has a groove which is open toward the other of the bearing races, and wherein the other of the bearing races has a lug ring that engages in the groove, wherein the lug ring is supported against the groove by a plurality of bearing assemblies that comprise at least two axial bearings mounted on opposite lug ring end faces to provide support in the axial direction, and at least one radial bearing to provide support in the radial direction, wherein the bearing assemblies include both sliding bearings and rolling bearings, wherein exactly two axial bearings and exactly two radial bearings support the lug ring against the groove and the two bearing races against each other, and wherein exactly one of the exactly two radial bearings is a sliding bearing and the exactly two axial bearings are rolling bearings.

20. The rotary bearing of claim 19, wherein the sliding bearing overlaps, when viewed in the radial direction, with one of the two axial bearings.

* * * * *